United States Patent
Takahashi et al.

(10) Patent No.: US 6,807,261 B2
(45) Date of Patent: Oct. 19, 2004

(54) DIGITAL KEY TELEPHONE SET AND DIGITAL KEY TELEPHONE SYSTEM

(75) Inventors: Toshiaki Takahashi, Hino (JP); Toshiaki Tanaka, Higashiyamato (JP); Takeshi Horiuchi, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 295 days.

(21) Appl. No.: 09/939,757

(22) Filed: Aug. 28, 2001

(65) Prior Publication Data

US 2002/0025029 A1 Feb. 28, 2002

(30) Foreign Application Priority Data

Aug. 29, 2000 (JP) ........................................ 2000-259536

(51) Int. Cl.⁷ ................................................ H04M 1/00
(52) U.S. Cl. ...................... 379/156; 379/165; 379/198; 379/166
(58) Field of Search ................................. 379/156, 165, 379/166, 198, 199; 370/300, 301, 304, 350; 340/3.2, 3.21, 825.2, 825.21, 825.56, 825.62, 825.65

(56) References Cited

U.S. PATENT DOCUMENTS

| | | | |
|---|---|---|---|
| 4,314,109 A | | 2/1982 | Sekiguchi et al. |
| 4,370,648 A | * | 1/1983 | Wagner et al. ............ 340/825.2 |
| 4,502,138 A | | 2/1985 | Doi et al. |
| 4,551,583 A | * | 11/1985 | Sekiguchi et al. ........... 379/164 |
| 4,583,221 A | | 4/1986 | Uchida et al. |
| 5,136,585 A | * | 8/1992 | Nizamuddin et al. ........ 370/271 |
| 5,319,700 A | * | 6/1994 | Mano et al. .............. 379/93.06 |
| 6,198,785 B1 | * | 3/2001 | Flynn .......................... 375/377 |
| 6,496,576 B2 | * | 12/2002 | Tanaka et al. ............... 379/156 |

* cited by examiner

Primary Examiner—Quoc Tran
(74) Attorney, Agent, or Firm—Finnegan, Henderson, Farabow, Garrett & Dunner, L.L.P.

(57) ABSTRACT

A clock generating circuit generates a clock of a rate corresponding to a Dch rate in response to a specification from the exterior. A counting circuit detects completion of reception of one frame by counting the clock number up to "11" at timing at which a start bit detecting circuit detects a start bit in a serial signal. An S/P converting circuit fetches a serial Dch signal bit by bit in synchronism with the clock, outputs the latest fetched 10 bits in a parallel form and latches eight bits of a real data portion among the output data into a latch circuit at the time when reception of one frame is completed. In parallel with the above operation, a parity calculating circuit and flag/interruption generating circuit set various flags and generate a reception completion interruption.

5 Claims, 4 Drawing Sheets

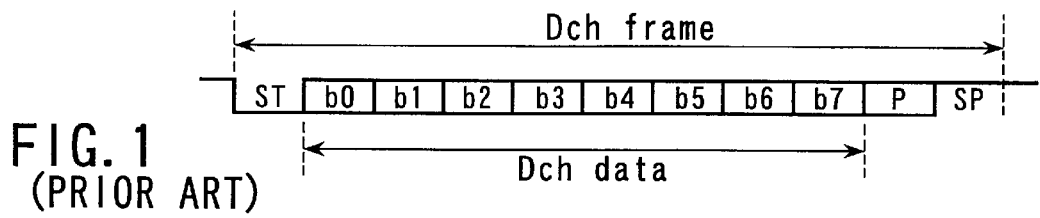
FIG. 1 (PRIOR ART)
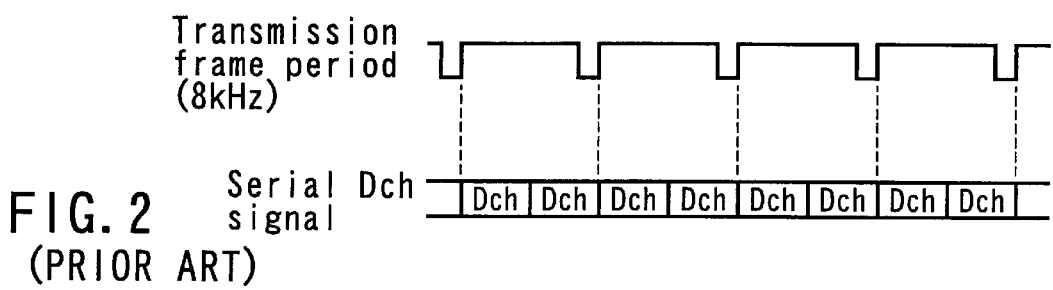
FIG. 2 (PRIOR ART)
FIG. 3 (PRIOR ART)
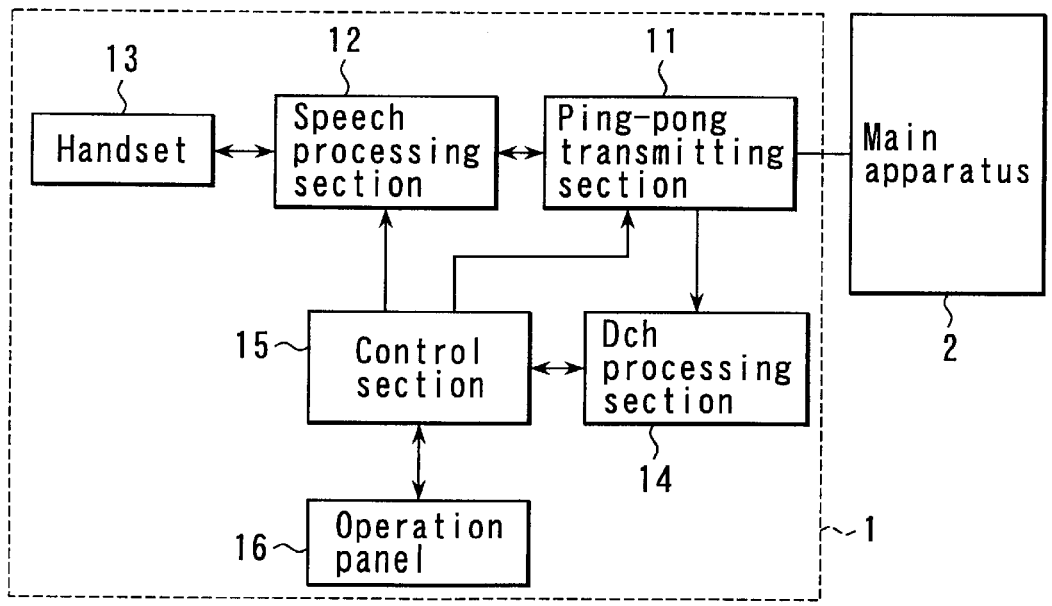
FIG. 4

DIGITAL KEY TELEPHONE SET AND DIGITAL KEY TELEPHONE SYSTEM

CROSS-REFERENCE TO RELATED APPLICATIONS

This application is based upon and claims the benefit of priority from the prior Japanese Patent Application No. 2000-259536, filed Aug. 29, 2000, the entire contents of which are incorporated herein by reference.

BACKGROUND OF THE INVENTION

1. Field of the Invention

This invention relates to a digital key telephone set which acquires a serial signal of frame structure from a key telephone unit, and a digital key telephone system including the digital key telephone set.

2. Description of the Related Art

A digital key telephone system performs data transfer on a data channel (Dch) based on ping-pong transmission between the key telephone unit and a key telephone set. The ping-pong transmission is a system for transmitting data by generally using the key telephone unit as a master device and using the key telephone set as a slave device. The key telephone set extracts data transmitted via the data channel from the key telephone unit by use of a ping-pong transmitting section and then reads the extracted data by use of a CPU.

Data transmitted via Dch is transmitted in the form of a serial signal (serial Dch signal) of a Dch frame as shown in FIG. 1. The Dch frame is a frame of 11-bit length having parity bits P attached before and after Dch data, and having a start bit ST and stop bit SP respectively attached to the head portion and tail portion of the frame. The Dch data is real data of eight bits (one byte) of b0 to b7. The start bit ST is a bit fixed at "0". The stop bit is a bit fixed at "1".

When eleven bits of the same frame are stored in the internal portion of the CPU, the CPU recognizes the eleven bits as a Dch frame and extracts Dch data from the eleven bits.

In this case, however, the CPU must perform an extremely large number of processes such as a lot of timer operations in order to extract Dch data. As a result, this imposes a heavy load on the CPU.

In a transmission path between the key telephone unit and the key telephone set, a B channel for transmitting voice data or the like is provided in addition to Dch. Dch data, Bch data and the like are multiplexed in a time sharing fashion to constitute a transmission frame having a sync frame of 8 kHz period. In the transmission frame, two bits are assigned for each frame in Dch. Therefore, the serial Dch signal extracted by the ping-pong transmitting section takes a state as shown in FIG. 2 and has a transmission capacity of 16 kbps.

However, in the conventional system, in order to attain stabilization of data, the same bit is transmitted in each of the two periods of the transmission frame. Therefore, as shown in FIG. 3, the same bit is repeatedly transmitted four times, and as a result, the transmission rate of Dch becomes 4 kbps which is ¼ of the transmission capacity.

In the recent system, a high transmission rate is required for Dch in order to attain highly sophisticated functions and it is considered that the serial Dch signal is transmitted at a transmission rate of 16 kbps by utilizing the transmission capacity to the maximum extent. However, a key telephone set which can cope with the transmission rate of 16 kbps cannot be connected to the key telephone unit which has been used so far.

As described above, in the conventional system, since data is fetched in the digital key telephone key telephone set based on the software process by the CPU, there occurs a problem that the load on the CPU due to the above task becomes extremely heavy.

Further, in the conventional system, the data channel can only cope with a single transmission rate, and in a new series digital key telephone key telephone set in which the transmission rate of the data channel is enhanced, there occurs a problem that the compatibility with the conventional system in which the transmission rate of the data channel is low cannot be attained.

BRIEF SUMMARY OF THE INVENTION

This invention has been made in order to solve the above problems and an object of this invention is to provide a digital key telephone set and a digital key telephone system which can alleviate the load of the CPU and cope with transmission rates of a plurality of data channels.

In order to attain the above object, according to one aspect of this invention, there is provided a digital key telephone set used as a key telephone set in a digital key telephone system which transmits a serial signal of a frame structure including a real data and a start bit arranged in the head portion of the real data, from a key telephone unit to the key telephone set via a data channel, comprising a clock generating circuit which selectively generates one of preset clock signals having different rates in response to a specification from the exterior; a start bit detecting circuit which detects the start bit from the serial signal transmitted to generate a detection signal; a counting circuit which counts the number of clocks of the clock signal in response to the detection signal and generates a fetch signal when the counted number is reached to a preset value; and an output circuit which fetches the serial signal at preset fetch timing which is synchronized with the clock signal, and outputs the real data in response to the fetch signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a diagram showing the frame structure of a serial Dch signal transmitted on Dch;

FIG. 2 is a diagram schematically showing the inserted state of the serial Dch signal in a transmission frame;

FIG. 3 is a diagram showing the state of a bit array of the serial Dch signal in the conventional key telephone system;

FIG. 4 is a block diagram showing the main configuration of a digital key telephone set according to one embodiment of this invention;

DETAILED DESCRIPTION OF THE INVENTION

Figure 5:
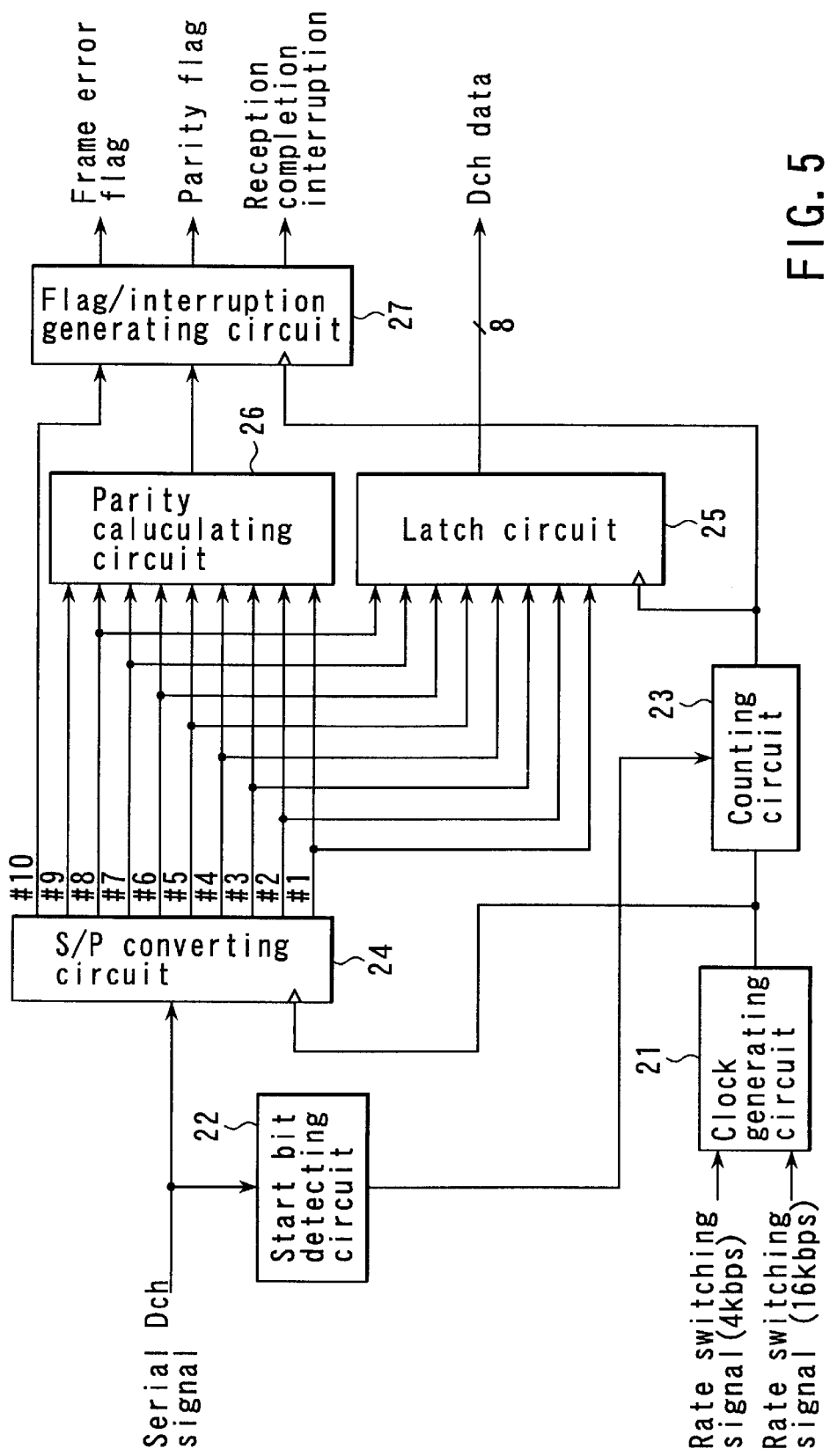
FIG. 5 is a block diagram showing the detail configuration of a Dch processing section 14 of FIG. 4.

There will now be described an embodiment of this invention with reference to the accompanying drawings.

FIG. 4 is a block diagram showing the main configuration of a digital key telephone key telephone set according to this embodiment.

In FIG. 4, a portion which is surrounded by broken lines and denoted by a reference numeral 1 is a digital key telephone set (which is hereinafter referred to as a key telephone set) which is connected to a key telephone unit 2 to construct a key telephone system.

As shown in FIG. 4, the key telephone set 1 includes a ping-pong transmitting section 11, speech processing section 12, handset 13, data channel processing section (which is hereinafter referred to as a Dch processing section) 14, control section 15 and operation panel 16.

The ping-pong transmitting section 11 transfers various types of data items by ping-pong transmission with respect to the key telephone unit 2. At the time of data reception, it extracts a serial speech signal and serial Dch signal from a transmission signal transmitted from the key telephone unit and supplies the serial speech signal to the speech processing section 12, and serial Dch signal to Dch processing section 14. Further, at the time of data transmission, the ping-pong transmitting section 11 multiplexes serial data signals supplied from the speech processing section 12 and control section 15 in a time sharing fashion to form a transmission signal and transmits the signal to the key telephone unit 2.

The speech processing section 12 extracts speech data contained in the serial speech signal supplied from the ping-pong transmitting section, and reproduces an analog receiver voice signal based on the speech data. Then, the speech processing section 12 drives the receiver of the handset 13 according to the reproduced receiver voice signal to output the receiver voice. Further, the speech processing section 12 is supplied with an analog transmitter voice signal generated from the transmitter of the handset 13, converts the transmitter voice signal into a serial speech signal of preset form and supplies the same to the ping-pong transmitting section 11.

The Dch processing section 14 is configured by a hardware circuit as will be described later. The Dch processing section 14 extracts Dch data contained in the serial Dch signal supplied from the ping-pong transmitting section 11, monitors the reception state of the serial Dch signal and generates an interruption signal so as to notify the control section 15 of completion of reception of Dch data.

The control section 15 is constructed to include a CPU, ROM, RAM and the like and performs the data communication process with respect to the key telephone unit 2 and controls the respective sections of the telephone key telephone set 1 according to the software process.

The operation panel 16 includes an input device such as a key switch group and a display device such as LCD, accepts various types of instruction inputs to the control section 15 which are generated by the user and notifies the user of various types of information items under the control of the control section 15.

FIG. 5 is a block diagram showing the detail configuration of the Dch processing section 14.

As shown in FIG. 5, the Dch processing section 14 includes a clock generating circuit 21, start bit detecting circuit 22, counting circuit 23, serial/parallel converting circuit (which is hereinafter referred to as an S/P converting circuit) 24, latch circuit 25, parity calculating circuit 26 and flag/interruption generating circuit 27.

The clock generating circuit 21 is supplied with two rate switching signals from the control section 15. The two rate switching signals respectively indicate a state in which the Dch processing section 14 is used in the key telephone system having a transmission rate 4 kbps of Dch, and a state in which the Dch processing section 14 is used in the key telephone system having a transmission rate 16 kbps of Dch and one of the two switching signals is supplied to the clock generating circuit 21. The clock generating circuit 21 generates and outputs a clock of 4 kHz when it is supplied with the rate switching signal for specifying 4 kbps and the clock generating circuit 21 generates and outputs a clock of 16 kHz when it is supplied with the rate switching signal for specifying 16 kbps. The clock output from the clock generating circuit 21 is supplied to the counting circuit 23 and S/P converting circuit 24.

The start bit detecting circuit 22 is supplied with a serial Dch signal transmitted from the ping-pong transmitting section 11. The start bit detecting circuit 22 monitors the received serial Dch signal to detect arrival of the start bit. When detecting arrival of the start bit, the start bit detecting circuit 22 supplies a reset signal to the counting circuit 23.

The counting circuit 23 performs the counting operation in synchronism with the clock supplied from the clock generating circuit 21. Then, the count value of the counting circuit 23 is reset to "0" when a reset signal is supplied thereto from the start bit detecting circuit 22. After this, it performs the counting operation until the count value becomes "11" and outputs a Dch frame timing signal in which a pulse is produced only when a preset period of time has elapsed after the count value became "11".

The S/P converting circuit 24 is supplied with a serial Dch signal transmitted from the ping-pong transmitting section 11. The S/P converting circuit 24 fetches the serial Dch signal bit by bit in synchronism with the clock supplied from the clock generating circuit 21. Then, the S/P converting circuit 24 holds the newest ten bits fetched therein and outputs the bits as output signals #1 to #10 in a parallel form. The fetching timings of the ten output signals #1, #2, #3, . . . , #9, #10 are sequentially arranged in this order on the time base, the output signal #1 corresponds to one bit which was first fetched and the output signal #10 corresponds to one bit which was fetched at the latest timing.

The latch circuit 25 is supplied with the output signals #1 to #8 of the S/P converting circuit 24. Then, the latch circuit 25 simultaneously fetches eight bits which are supplied as the output signals #1 to #8 of the S/P converting circuit 24 at latch timing synchronized with the Dch frame timing signal supplied from the counting circuit 23 and holds the eight bits until next latch timing. The latch circuit 25 outputs the latched eight bits as received Dch data to the control section 15.

The parity calculating circuit 26 is supplied with the output signals #1 to #9 of the S/P converting circuit 24. The parity calculating circuit 26 always makes parity calculation based on nine bit data which are supplied as the signals #1 to #9 while regarding a bit which is supplied as the signal #9 as a parity bit. Then, the parity calculating circuit 26 supplies the result of the parity calculation to the flag/interruption generating circuit 27.

The flag/interruption generating circuit 27 is supplied with the output signal #10 of the S/P converting circuit 24 in addition to the Dch frame timing signal output from the counting circuit 23 and the result of the parity calculation output from the parity calculating circuit 26. The flag/interruption generating circuit 27 determines whether a frame error is present or not based on the state of the output signal #10 of the S/P converting circuit 24 at timing synchronized with the Dch frame timing signal and outputs a frame error flag indicating the result of determination. Further, the flag/interruption generating circuit 27 outputs a parity flag indicating the result of the parity calculation at timing synchronized with the Dch frame timing signal. The flags can be freely referred to by the control section 15. In addition, the flag/interruption generating circuit 27 supplies a reception completion interruption to the control section 15 at timing synchronized with the Dch frame timing signal.

Next, the operation of the key telephone set 1 configured as described above is explained. In this case, since the operation associated with telephone call or conversation is the same as that in the conventional key telephone set of the same type, the explanation thereof is omitted and the operation associated with reception of Dch is explained in detail.

First, in the ping-pong transmitting section 11 extracts a serial Dch signal which is discretely transmitted from the key telephone unit 2 at a rate of two bits for each frame of the transmission frame of 8 kHz period. Then, it supplies the serial Dch signal to the Dch processing section 14 at a rate of 16 kbps while the bits are successively arranged.

(16 kbps Operation)

In a case where the key telephone set 1 is connected to the key telephone unit 2 which transmits the serial Dch signal at the bit rate of 16 kbps, corresponding settings are made on the control section 15 by effecting preset specifying operations on the operation panel 16, for example. In this case, the control section 15 supplies a rate switching signal which is used for specifying 16 kbps to the Dch processing section 14.

Figure 6:
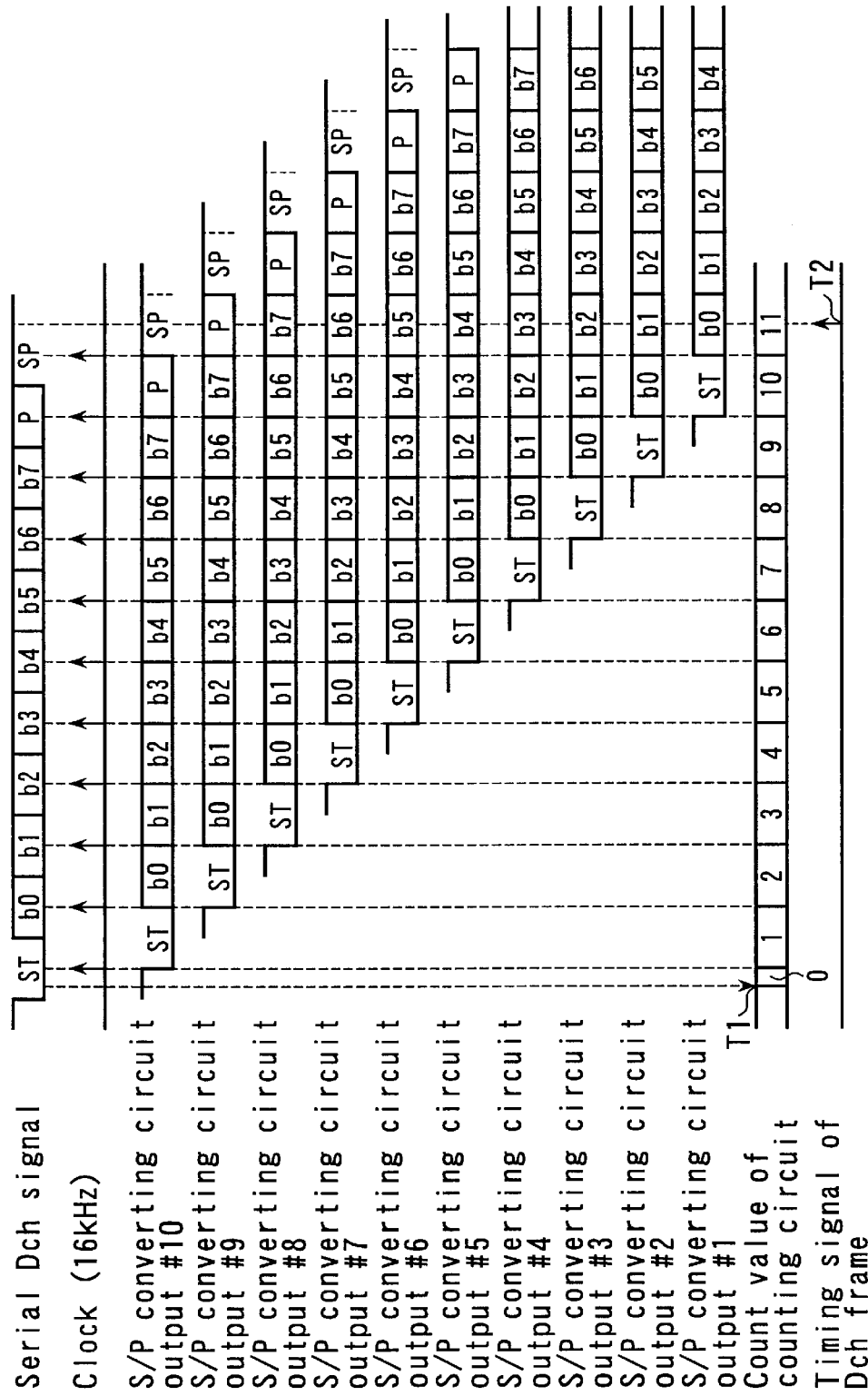
FIG. 6 is a timing chart showing the operation timing at the time of the 16 kbps operation.

If the rate switching signal used for specifying 16 kbps is thus supplied from the control section 15, the clock generating circuit 21 in the Dch processing section 14 generates a clock of 16 kbps at timings with respect to the serial Dch signal as shown in FIG. 6, for example.

Therefore, in the S/P converting circuit 24, the serial Dch signal is sequentially fetched in synchronism with the punching clock of 16 kHz. Since the key telephone unit 2 transmits the serial Dch signal at a bit rate of 16 kbps, a bit which is different for each one-bit period is inserted into the serial Dch signal as shown in FIG. 6. Then, the S/P converting circuit 24 fetches the respective bits.

The S/P converting circuit 24 outputs the newest fetched bit as the output signal #10, outputs the bit fetched one cycle (time period) before the present time as the output signal #9, outputs the bit fetched two cycles (time periods) before the present time as the output signal #8, outputs the bit fetched three cycles (time periods) before the present time as the output signal #7, outputs the bit fetched four cycles (time periods) before the present time as the output signal #6, outputs the bit fetched five cycles (time periods) before the present time as the output signal #5, outputs the bit fetched six cycles (time periods) before the present time as the output signal #4, outputs the bit fetched seven cycles (time periods) before the present time as the output signal #3, outputs the bit fetched eight cycles (time periods) before the present time as the output signal #2, and outputs the bit fetched nine cycles (time periods) before the present time as the output signal #1. Thus, the output signals #1 to #10 of the S/P converting circuit 24 become serial Dch signals which are sequentially delayed by one bit in an order of #1, #2, . . . , #10.

The start bit detecting circuit 22 detects the start bit ST set in the head portion of the Dch frame in the serial Dch signal, and if the start bit can be detected, it resets the counting circuit 23. As a result, the count value of the counting circuit 23 is reset to "0" (at time T1 in FIG. 6).

The counting circuit 23 performs the counting operation for sequentially incrementing the count value by one in synchronism with the clock. Therefore, the counting circuit 23 counts the clock number of clocks after the start bit ST has been detected by the start bit detecting circuit 22. The start bit detecting circuit 22 resets the counting circuit 23 after the start bit ST occurred and before fetching timing of the start bit ST comes. Therefore, the count value of the counting circuit 23 becomes a value which indicates the number of bits fetched into the S/P converting circuit 24 among the bits of one Dch frame. Then, the counting circuit 23 causes a pulse to occur in the Dch frame timing signal when the count value becomes "11" (at time T2 in FIG. 6). In this case, "11" corresponds to the number of bits constructing one Dch frame.

The time T2 is set at timing immediately after the eleventh bit of one Dch frame, that is, the stop bit SP is fetched by the S/P converting circuit 24. That is, in the output signal of the S/P converting circuit 24, ten bits obtained by excluding the start bit ST from the eleven bits of one Dch frame are obtained.

The latch circuit 25 fetches the output signals #1 to #8 of the S/P converting circuit 24 in synchronism with the Dch frame timing signal. Then, 8-bit Dch data contained in the Dch frame which is now received is fetched into the latch circuit 25 and latched therein.

At this time, in addition to the Dch data latched in the latch circuit 25, a parity bit P attached to the same Dch frame which contains the above Dch data is supplied as the signal #9 to the parity calculating circuit 26. The parity calculating circuit 26 always makes parity calculation while regarding a bit which is supplied as the signal #9, as a parity bit. Therefore, the parity calculation relating to the Dch frame now received can be correctly made.

The flag/interruption generating circuit 27 fetches an output of the parity calculating circuit 26 in synchronism with the Dch frame timing signal so as to acquire the result of parity calculation correctly made as described above. Then, the flag/interruption generating circuit 27 sets a parity flag to indicate the thus acquired result of parity calculation.

Further, the flag/interruption generating circuit 27 fetches the output signal #10 of the S/P converting circuit 24 in synchronism with the Dch frame timing signal. Since the output signal #10 at the time T2 is set as the stop bit SP, the flag/interruption generating circuit 27 fetches the stop bit SP. Since the stop bit SP is originally set at "1", the flag/interruption generating circuit 27 determines whether or not the stop bit fetched is set at "1". If the fetched stop bit SP is set at "1", it determines that there is no frame error and if the fetched stop bit is set at "0", it sets a frame error flag indicating that there is a frame error.

Further, since reception for one Dch frame is terminated at the time T2 as described above, the flag/interruption generating circuit 27 supplies a reception completion interruption to the control section 15 at timing synchronized with the Dch frame timing signal in order to notify the control section 15 of the above fact.

(4 kbps Operation)

In a case where the key telephone set 1 is connected to the key telephone unit 2 which transmits the serial Dch signal at a bit rate of 4 kbps, corresponding settings are made on the control section 15 by effecting preset specifying operations on the operation panel 16, for example. In this case, the control section 15 supplies a rate switching signal which is used for specifying 4 kbps to the Dch processing section 14.

Figure 7:
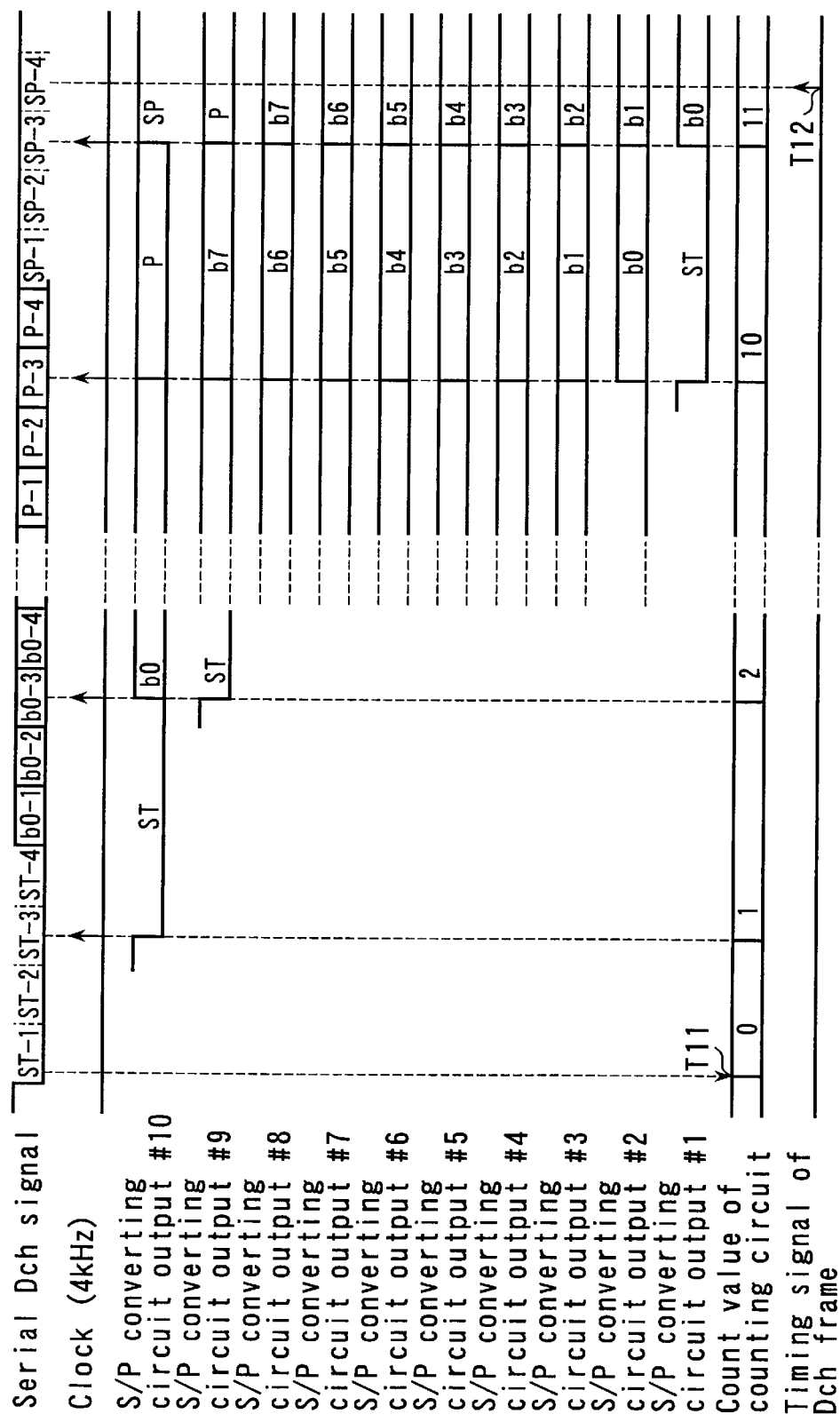
FIG. 7 is a timing chart showing the operation timing at the time of the 4 kbps operation.

If the rate switching signal used for specifying 4 kbps is thus supplied from the control section 15, the clock generating circuit 21 in the Dch processing section 14 generates a clock of 4 kbps at timings as shown in FIG. 7 with respect to the serial Dch signal, for example.

Therefore, in the S/P converting circuit 24, the serial Dch signal is sequentially fetched in synchronism with the clock of 4 kHz. Since the key telephone unit 2 transmits the serial Dch signal at a bit rate of 4 kbps, a bit which is the same over the four-bit period is inserted into the serial Dch signal. Then, the S/P converting circuit 24 sequentially fetches each bit of the four successive same bits. The S/P converting circuit 24 outputs the newest fetched bits in the same manner as in the case of the 16 kbps operation. Therefore, the output signals #1 to #10 of the S/P converting circuit 24 become serial Dch signals which are sequentially delayed by four bits in an order of #1, #2, . . . , #10.

The start bit detecting circuit 22 detects the start bit ST in exactly the same manner as in the case of the 16 kbps operation, and if the start bit can be detected, it resets the counting circuit 23. As a result, the count value of the counting circuit 23 is reset to "0" (at time T11 in FIG. 7).

The counting circuit 23 performs the counting operation for sequentially incrementing the count value by one in synchronism with the clock. Therefore, the counting circuit 23 counts the clock number after the start bit ST has been detected by the start bit detecting circuit 22. The start bit detecting circuit 22 resets the counting circuit 23 after the start bit ST occurred and before fetching timing of the start bit ST comes. Therefore, the count value of the counting circuit 23 becomes a value which indicates the number of bits fetched into the S/P converting circuit 24 among the bits of one Dch frame. Then, the counting circuit 23 causes a pulse to occur in the Dch frame timing signal when the count value becomes "11" (at time T12 in FIG. 7). In this case, "11" corresponds to the number of bits constructing one Dch frame.

After this, the same processes as in the case of the 16 kbps operation are performed in the latch circuit 25, parity calculating circuit 26 and flag/interruption generating circuit 27.

As described above, according to the present embodiment, the Dch processing section 14 extracts and latches Dch data contained in each Dch frame. Further, the Dch processing section 14 detects a parity error and frame error based on the parity bit for each Dch frame and outputs a flag indicating the result of detection. In parallel with the above processes, the Dch processing section 14 generates an interruption to notify the control section 15 that reception of one Dch frame is completed.

Therefore, the control section 15 recognizes the frame error flag and parity flag at adequate timing after a reception completion interruption is supplied from the Dch processing section 14 and it may fetch Dch data latched in the latch circuit 25 when it is determined that neither the frame error nor the parity error occurs. As a result, the processing load of the control section 15 for acquiring Dch data is extremely alleviated and the process can be effected without causing any problem even if the bit rate is 16 kbps as described above.

Further, according to this embodiment, the Dch processing section 14 can perform the 4 kbps operation corresponding to the bit rate of 4 kbps simply by changing the frequency of the clock while the 16 kbps operation corresponding to the bit rate of 16 kbps is being performed. Therefore, a telephone key telephone set designed to maintain the downward compatibility so as to flexibly cope with a low-rate key telephone unit 2 which is known in the art can be realized.

This invention is not limited to the above embodiment. For example, in the above embodiment, key telephone set 1 is used in the system which transmits data as a Dch frame of frame structure as shown in FIG. 5 on Dch, but it can be constructed to cope with another frame structure.

Further, in the above embodiment, key telephone set 1 copes with two types of bit rates of 16 kbps and 4 kbps, but it can be made to cope with three or more types of bit rates and the bit rates are not limited to 16 kbps and 4 kbps.

In the above embodiment, key telephone set 1 performs a frame error check and parity check, and outputs a frame error flag and parity flag indicating the checking results, but it can be performed only one of the checks or another check process.

In addition, this invention can be variously modified without departing from the technical scope thereof.

As described above in detail, according to this invention, it is possible to provide a digital key telephone set and a digital key telephone system capable of alleviating the load of the CPU and coping with a plurality of data channel transmission rates.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital key telephone set used as a key telephone set in a digital key telephone system which transmits a serial signal of n-bit frame structure, wherein n is a desired integral number of frame structure bits, including real data of m bits, wherein m is a desired integral number of real data bits, and preset additional bits including a start bit arranged in the head portion of the real data, from a key telephone unit to the key telephone set via a data channel, and fetches the real data among the serial signal by a controller of the terminal comprising:

a clock generating circuit which selectively generates one of a plurality of preset clock signals having different rates in response to a signal for specifying a rate;

a start bit detecting circuit which detects the start bit in the serial signal transmitted to generate a detection signal;

a counting circuit which counts the number of clocks of the clock signal in response to the detection signal and generates a fetch signal when the count reaches n;

a parallel converting circuit which fetches the serial signal at preset fetch timing which is synchronized with the clock signal, and outputs preset m bits among the serial signal in response to the fetch signal;

a latch circuit which fetches and latches preset m bits output from said parallel converting circuit in response to the fetch signal; and a reception state monitoring circuit which outputs a completion notifying signal indicating that reception of one frame of the serial signal is completed in response to the fetch signal, monitors the reception state of the serial signal based on the state of a preset bit output from said parallel converting circuit, and outputs a flag signal indicating the monitoring result to the controller.

2. A digital key telephone system comprising:

the digital key telephone set according to claim 13; and a key telephone unit which transmits a serial signal of n-bit frame structure, wherein n is a desired integral number of frame structure bits, including real data of m bits, wherein m is a desired integral number of real date bits, and preset additional bits including a start bit arranged in the head portion of the real data, to said digital key telephone set via a data channel.

3. The digital key telephone set according to claim 1, wherein the parallel converting circuit outputs (n−1) bits respectively fetched at the latest (n−i) fetch timing in a parallel form.

4. The digital key telephone set according to claim 1, wherein the latch circuit fetches and latches preset m bits among the (n−1) bits output from said parallel converting circuit in response to the fetch signal.

5. The digital key telephone set according to claim 1, wherein the reception state monitoring circuit monitors the reception state of the serial signal based on the state of a preset bit among the (n−1) bits output from said parallel converting circuit.

* * * * *

UNITED STATES PATENT AND TRADEMARK OFFICE
CERTIFICATE OF CORRECTION

PATENT NO. : 6,807,261 B2
DATED : October 19, 2004
INVENTOR(S) : Takahashi et al.

It is certified that error appears in the above-identified patent and that said Letters Patent is hereby corrected as shown below:

Column 9,
Line 9, change "claim 13;" to -- claim 1; --
Line 13, change "real date" to -- real data --.

Column 10,
Line 3, change "(n-i)" to -- (n-1) --.

Signed and Sealed this

Eleventh Day of January, 2005

JON W. DUDAS
*Director of the United States Patent and Trademark Office*